INVENTOR.
THOMAS L. FAWICK
BY Willard D. Eakin
ATTY.

INVENTOR.
THOMAS L. FAWICK
BY Willard D. Eakin
ATTY.

United States Patent Office 2,766,591
Patented Oct. 16, 1956

2,766,591

DUAL CYLINDER-AND-PISTON ASSEMBLY

Thomas L. Fawick, Cleveland, Ohio, assignor to Fawick Corporation, a corporation of Michigan Application March 17, 1953, Serial No. 342,891

1 Claim. (Cl. 60—97)

This invention relates to cylinder-and-piston assemblies in which two pistons, preferably of different effective diameters, are mounted in a single cylinder structure for alternative or concurrent actuation of the pistons according to the amount of motive force desired.

Such an assembly is desirable, for example, for actuating the friction shoes of a vehicle brake, to provide moderate braking forces for ordinary braking and a greater force for emergency braking or for parking the vehicle. A further advantage of such an assembly is that it permits the use of pressure fluids from different sources, and permissibly at different pressures, for the respective pistons, and permissibly air from one source and hydraulic braking fluid from the other source.

The chief objects of the present invention are to provide, in such an assembly, simplicity, economy, strength, lightness and durability.

A further object is to provide an assembly of this type which, in relation to the length of its stroke, can be of short over-all length in the direction of its stroke, this feature being of importance, for example, in the case of aircraft or other vehicle brakes in which only moderate radial space is available between the hub structure and the brake drum.

Another object is to provide for the piston of larger diameter an effective cross-sectional area that is inclusive of the cross-sectional area of the piston of small diameter.

Figure 2:
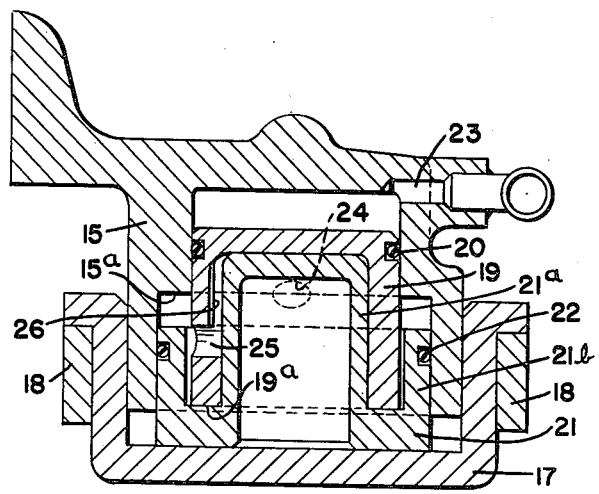
Fig. 2 is a like section of the cylinder-and-piston assembly, with only the piston of smaller diameter functioning.
Figure 3:
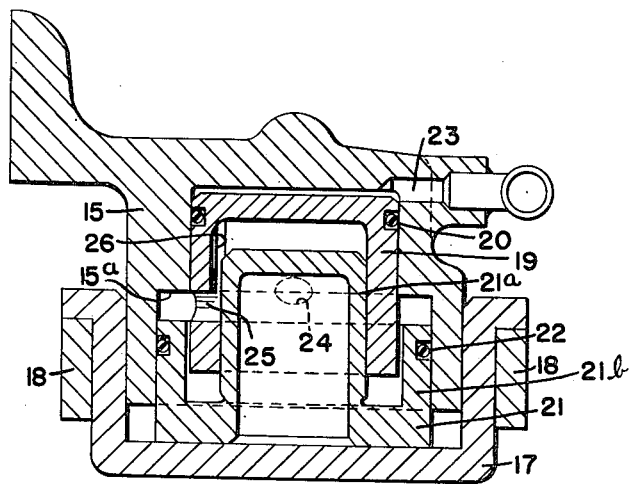

Fig. 3 corresponds to Fig. 2 except that in Fig. 3 the large-diameter piston, instead of the small diameter piston, is shown as functioning.

Figure 1:
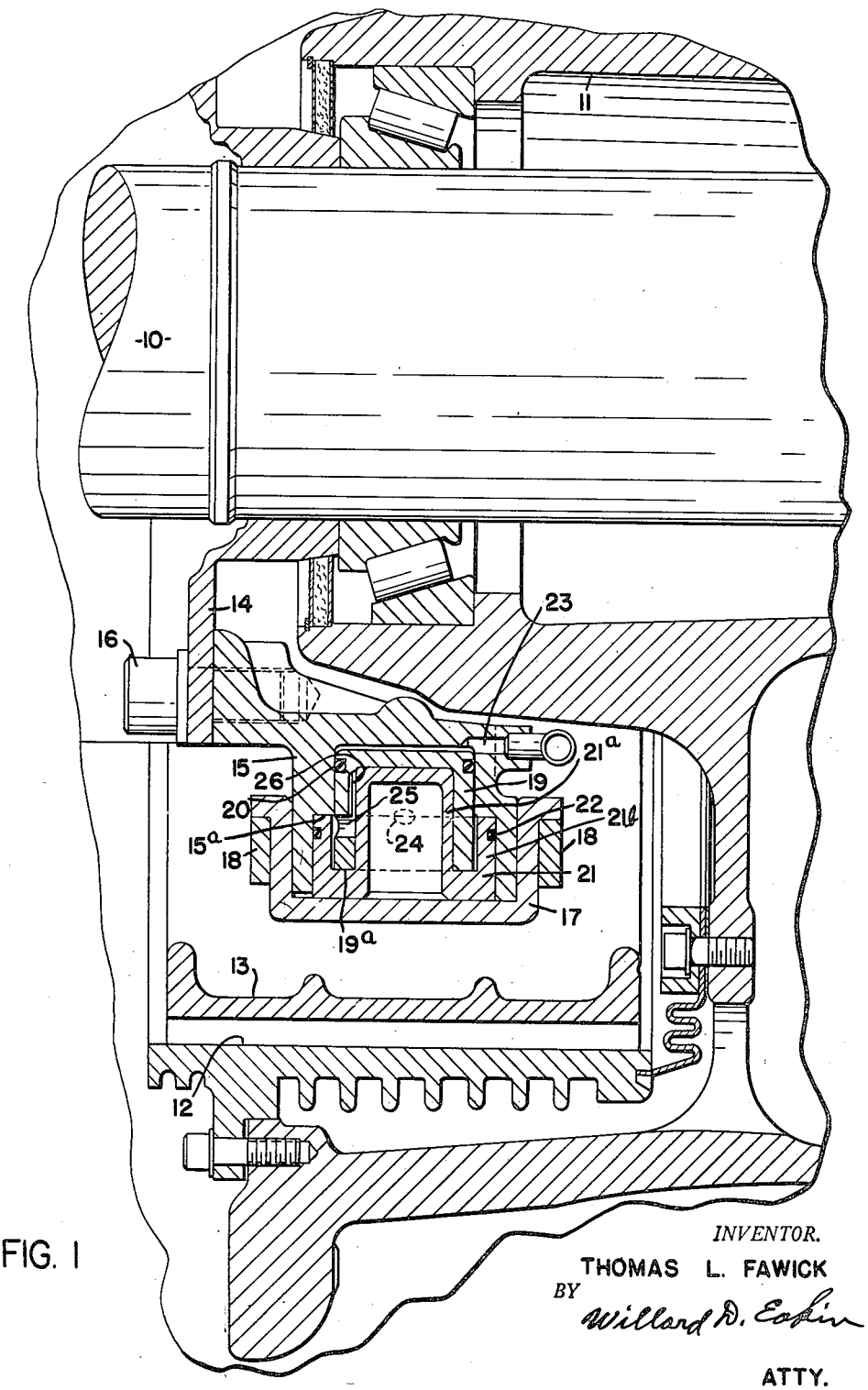
Fig. 1 is a fragmentary axial section of a wheel, axle and brake assembly comprising an embodiment of my invention in its preferred form, with both of the pistons retracted.

Refering first to Fig. 1, 10 is the axle, 11 the wheel, 12 the brake drum and 13 one of the brake shoes of an airplane, for example.

Fixed on the axle is a brake hub, torque plate or flange 14 to which are secured a circumferentially spaced set of cylinder-and-piston assemblies, of which it is sufficient to show and describe only one, as they are all alike.

Each comprises a cylinder member 15 secured to the flange 14 by bolts such as the bolt 16, and a yoke 17 stradling the outer end of the cylinder member and associated with the piston structure and with levers 18, 18, said levers, with connections (not shown) to the flange 14 and to the brake shoe 13, being adapted to actuate the brake under the force of the cylinder-and-piston assembly.

The cylinder member 15 is formed with a small-diameter piston chamber in its base portion, containing a small-diameter piston 19 having a sealing ring 20. Outwardly and in continuation of the small-diameter piston chamber the cylinder member is formed with a large-diameter piston chamber which is open to the yoke 17 and which contains a large-diameter piston 21 having a sealing ring 22. In a sense the member 15 defines a single piston chamber having portions of different diameters.

The small-diameter piston 19 is of outwardly open cup shape and has telescoped in it a central, permissibly hollow, guiding stem 21ᵃ formed on the large-diameter piston 21.

For moving the small-diameter piston 19, and with it the large-diameter piston 21, the cylinder member 15 has at its base a fluid inlet-outlet passage 23.

The large-diameter piston 21 is formed with a peripheral flange 21ᵇ which carriers the sealing ring 22 and surrounds the outer end portion of the small-diameter piston, with substantial clearance to provide an annular space between the two piston parts for flow of motive onto the end-edge face 19ᵃ of the small diameter piston.

When the large-diameter piston is in its retracted position the annular end-edge face of its flange 21ᵇ abuts or almost abuts an annular shoulder 15ᵃ of the cylinder member which is incident to the different diameters of the piston chambers, and at the position of the shoulder 15ᵃ the cylinder is formed with an inlet-outlet passage 24.

Near the shoulder 15ᵃ a hole 25 extends through the wall of the small-diameter piston and is in communication with a groove 26 formed in the inner face of that wall, for passage of fluid, from the inlet 24, to force apart the guide-stem 21ᵃ of the large-diameter piston and the floor of the cup-shaped small-diameter piston.

The overlapping of the small-diameter piston 19 with relation to the flange 21ᵇ of the large-diameter piston permits a long guide-bearing contact of the two pistons with each other in conjunction with adequate range of movement of the large-diameter piston in spite of short-over-all length of the assembly.

Working movement of the small-diameter piston 19 is illustrated in Fig. 2, in which pressure fluid, entering through the passage 23 and sealed against by the sealing ring 20, is effective only through the cross-sectional area of the small-diameter piston 19, which carries with it the large-diameter piston 21, with permissibly only atmospheric pressure in the annular space that is opened up between the shoulder 15ᵃ of the cylinder member and the end-edge face of the flange 21ᵇ of the large diameter piston.

Working movement of the large-diameter piston 21 is illustrated in Fig. 3, in which pressure fluid, entering through the passage 24, acts upon the large-diameter piston throughout the cross-sectional area that is defined by the sealing face of the sealing ring 22, the small-diameter piston 19 being forced back to the base of its chamber if pressure in the passage 23 is atmospheric pressure or is less per square inch than the pressure in the passage 24.

If desired, however, moderate pressure, preferably pneumatic pressure, can be supplied through the passage 24, and high pressure, preferably hydraulic, can be supplied, alternatively or at the same time, through the passage 23, or vice versa. Also, high pressure in the passage 23 can be supplied in conjunction with high pressure in the passage 24, if maximum braking force is desired.

The invention as shown and described is susceptible of modification without departure from the intended scope of the appended claim.

I claim:

A cylinder-and-piston assembly comprising a cylinder structure defining a single piston chamber having a small-diameter part and a large-diameter part in unconstricted continuation of each other, a cylinder-head for an end of said cylinder structure, relatively movable pistons slidable in and sealing against the walls of said small-diameter and large-diameter parts of said piston chamber respectively, means for conducting pressure fluid into and out of said cylinder structure at a position between said cylinder head and the piston nearest to it, and means, independent of the first said means, for conducting pressure fluid into and out of said cylinder structure at a position between the two pistons, one of said pistons having a part guidingly telescoped in a closed-bottomed, cup-shaped portion of the other and one of the pistons being formed with a passage to permit flow of pressure fluid between the closed bottom of said cup-shaped portion of the one piston and the part of the other piston that is telescoped therein.

References Cited in the file of this patent

UNITED STATES PATENTS

| | | |
|---|---|---|
| 429,667 | Webb | June 10, 1890 |
| 612,507 | Rothe | Oct. 18, 1898 |
| 747,772 | Rickman | Dec. 22, 1903 |
| 2,453,785 | Cousino | Nov. 16, 1948 |
| 2,497,438 | Butler | Feb. 14, 1950 |
| 2,513,192 | McFarland | June 27, 1950 |
| 2,533,959 | Rothschild | Dec. 12, 1950 |
| 2,569,226 | Carter | Sept. 25, 1951 |
| 2,633,712 | Sheppard | Apr. 7, 1953 |